United States Patent [19]

Tausch et al.

[11] Patent Number: 5,140,847
[45] Date of Patent: Aug. 25, 1992

[54] CABLE FOR DETECTING LOCATION OF LIQUIDS

[75] Inventors: Norbert Tausch, Solingen; Wolfgang Diegmann, Wupperal, both of Fed. Rep. of Germany

[73] Assignee: Kabelwerke Reinshagen GmbH, Fed. Rep. of Germany

[21] Appl. No.: 601,764

[22] PCT Filed: Feb. 20, 1990

[86] PCT No.: PCT/DE90/00113

§ 371 Date: Dec. 10, 1990

§ 102(e) Date: Dec. 10, 1990

[87] PCT Pub. No.: WO90/10208

PCT Pub. Date: Sep. 7, 1990

[30] Foreign Application Priority Data

Feb. 22, 1989 [DE] Fed. Rep. of Germany ... 8902073[U]

[51] Int. Cl.⁵ .................................................. G01M 3/38
[52] U.S. Cl. .................................. 73/40; 73/40.5 R; 174/11 R
[58] Field of Search .............. 73/40, 40.5 R; 340/605, 340/604; 174/11 R; 200/52 R, 61.04

[56] References Cited

U.S. PATENT DOCUMENTS

| 4,570,477 | 2/1986 | Sugibuchi | 73/40.5 R |
| 4,710,353 | 12/1987 | Tanaka et al. | 73/40 X |
| 4,926,165 | 5/1990 | Lahlouth et al. | 73/40 X |

FOREIGN PATENT DOCUMENTS

| 0086024 | 8/1983 | European Pat. Off. | 73/40.5 R |
| 30622 | 3/1981 | Japan | 73/40 |
| 48533 | 5/1981 | Japan | 73/40 |
| 105533 | 6/1984 | Japan | 73/40 |

Primary Examiner—Hezron E. Williams
Assistant Examiner—Joseph W. Roskos
Attorney, Agent, or Firm—Reising, Ethington, Barnard, Perry & Milton

[57] ABSTRACT

A cable for detecting location of liquids comprises a core element sensitive to pulling or bending, a first sheathing of a material which swells in the liquid to be detected, and a sheathing affixed to the first sheathing and comprising a dense plaiting of high-stability yarn with low longitudinal expansion, and having a plaiting angle which is greater or smaller than the so-called neutral angle.

12 Claims, 1 Drawing Sheet

CABLE FOR DETECTING LOCATION OF LIQUIDS

FIELD OF THE INVENTION

The invention concerns a cable for detecting location of liquids, whereby, when liquid enters, a physical change occurs in the cable structure at the leakage point, which change is measured and evaluated.

BACKGROUND OF THE INVENTION

Cables for detecting location of liquids are used e.g. in the monitoring of liquids in storage and transport, which might have harmful effects on the environment, particularly on air, soil, and ground water. This includes e.g. pipelines or tanks for oils, propellants, and chemicals of various kinds. Cables for this purpose are known, in which the electrical characteristics change in the area of the liquids to be located. These changes are mechanically detected and serve to define the position of the leakage.

The previously known measurement procedures and cables are expensive and have limited usefulness due to the length of application. Detectability with aid of electrical procedures is good, and the determination of the leakage location is possible with simple means. However, the known procedures of this kind are susceptible, particularly to electromagnetic disturbances. In addition, the possible length is strictly limited by the transversal conductibility of the insulation materials. With respect to location of hydro-carbonbased liquids, it is possible to locate these as well by means of changes of the dielectric characteristics of conductors at the location of the leakage. However, there are problems due to the fact that the liquids to be detected are very similar to the insulation materials particularly with respect to the dielectric characteristics. Reliable location is thus possible only with great wetting lengths or over small lengths of measurement cables.

The purpose of the invention is to provide a cable for detecting location of liquids, which cable rapidly and reliably indicates a presence of liquids of varying kinds and thereby allows a precise location of the leakage over a significantly greater distance than has hitherto been possible.

SUMMARY OF THE INVENTION

In accordance with this invention, these requirements are fulfilled with a cable for detecting location of liquids, in which a physical change of the cable structure at the leakage point occurs in the presence of liquid, which change is detected. This is accomplished by a cable having a core element which is sensitive to pulling or bending, a first sheathing of material that swells in the liquid to be detected, and a second sheathing fixed on the first sheathing, consisting of a plaiting of high stability yarn With low stretching characteristics, and with a plaiting angle greater or smaller than the so-called neutral angle.

Further, a third sheathing which is of a material which is of a structure permeable by the liquid to be detected may serve as protection against external mechanical effects. In order to assure a reliable indication, the material of the third protective sheathing can go into solution with the liquid to be detected.

Further, in order to reliably exclude the possibility of radial penetration of the swelling material through the plaiting, particularly in the case of swelling materials with low viscosity, an intermediate layer can be provided between the first and second sheathing, which layer, though permeable to the liquid to be detected, nevertheless prevents the swelling material from penetrating the plaiting. This intermediate layer may consist e.g. of a high-strength, absorbent fibrous web and may be applied in the form of strips.

Further, according to the type of liquid to be located, the swelling agent may be a polymer, an elastomer, particularly a silicone, or a mixture of these, or a mixture of materials with at least a portion of these materials. Particularly, the swelling material may be extruded onto the surface, or applied in the form of strips, particularly in the form of a swelling fibrous web or a swelling powder, introduced on or in a strip. In the case of aqueous liquids to be located, a cellulose-based material is appropriate.

Further, the plaiting can be formed from a yarn of fiberglass, polyamide, carbon fibers, etc.

Further, a plaiting or an open pore sheathing of a synthetic material can be used as external protective sheathing.

Further, according to the invention, the core element may be an electrical conductor or an optical fiber. If an electrical conductor is used as the core element, it is preferably thin and fragile.

If an optical conductor, particularly in the form of a fiber optic circuit is used as core element, very long distances can be monitored. The optical fiber can be loosely surrounded by a tube or have a fixed protective sheathing. If this is the case, the bending, i.e. a break in the optical fiber can serve the purpose of reliable detection, particularly without electrical and electromagnetic disturbances, and particularly by means of a known OTDR measurement device. Unrestricted use thereof is also possible in areas where there is a risk of explosion. Localization is possible with great precision with less than one percent deviation, and with a diameter of approximately 1.5 mm, the optical fiber cable requires minimal space and cost for laying. It is a significant characteristic of the invention that the core element is of such structure that it is frangible and very easily cracked or broken to provide a discontinuity in an electrical or optical characteristic. This enables the location at which the liquid penetrates to the cable to be identified reliably and rapidly, be it by means of electrical or optical detection procedures.

An example of the invention is shown in the drawing and will be described in the following with reference to the figures.

BEST MODE FOR CARRYING OUT THE INVENTION

Figure 1:
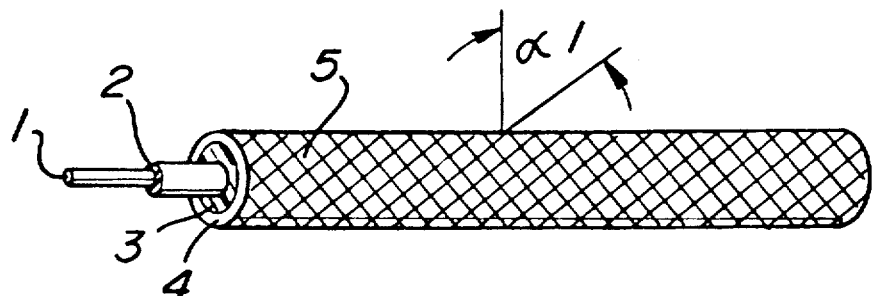
FIG. 1 shows a section of a cable according to the invention, with an external plaiting, without protective sheathing.

A core element 1 is an optical fiber disposed in a protective tube 2 of a synthetic material. When short distances are to be monitored, a synthetic material can be selected for the fiber, for longer distances, one would select a glass fiber with lower attenuation. However, optical fibers with solid sheathing or electrically conductive wires of a material easily broken may be used.

The protective tube 2 is surrounded by a swellable sheathing 3. This may be extruded or applied in the form of strips. It may consist of a polymer, an elastomer, or a swelling fibrous web, or a swelling strip. For the location of hydrocarbons such as oils, solvents, propellants, etc., it is possible to use e.g. silicone or a similar elastomer. For the detection of aqueous liquids, one can use materials that swell in water, e.g. cellulose-based materials.

A layer 4 of a high stability, absorbent fibrous web is applied over the sheathing 3. According to the choice of swelling material and the liquid to be detected, this assures that the swelling material cannot penetrate radially into the plaiting 5 which is to be applied, but that it only expands radially in unison with the plaiting 5 in the presence of the liquid. The plaiting 5 (i.e. braiding) has a specific plaiting angle al, which is greater than the so-called neutral plaiting angles. In order to protect the plaiting 5, an open-pore protective sheathing is applied over it, i.e. a protective sheathing (not illustrated) which can be penetrated by the liquid to be detected.

The plaiting has the following structure:

Fiberglass EC9, 68 tex/1. Sleaving: ⅓ time. Spools: 16. Plaiting: 9.6. Covering: 89.9%. Plaiting angle: 64.8°.

Figure 2:
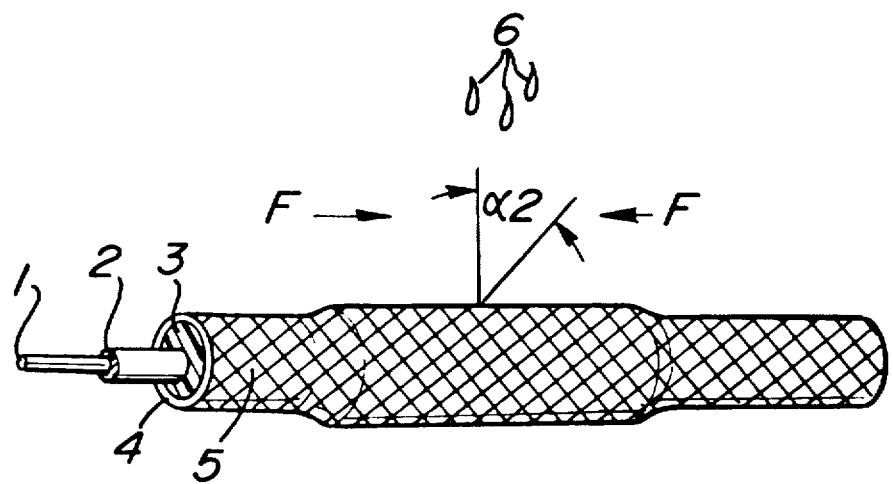
FIG. 2 shows the cable according to FIG. 1, when it swells in the presence of liquid and contracts axially.
Figure 3:
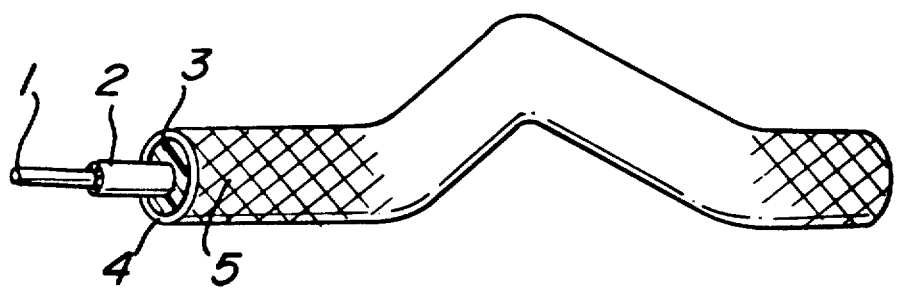
FIG. 3 shows the cable according to FIG. 1, after the contraction of the plaiting has caused a buckling of the core element.

The functioning is explained with reference to FIGS. 2 and 3.

The sheathing 3 will expand on contact with a liquid 6 causing a swelling. A radial pressure is exerted on the layer 4 and the plaiting 5. Due to the radial expansion of the plaiting 5, a shortening of the plaiting 5 occurs in the direction F. The plaiting angle al is decreased. This causes a linear contraction force on the tube 2 and the optical fiber 1. Ultimately, this contraction causes a buckling of the optical fiber 1 below the plaiting 5, see FIGURE 3. This, in turn, causes an irregular arrangement of the plaiting 5 in this area, a kind of buckling, see FIG. 3. The buckling causes breaking of the sensitive optical fiber 1. This break now serves as a reliable physical magnitude or optical discontinuity for identifying the location of the break and consequently the point of leakage that was sought. The evaluation can be made reliably and precisely, e.g. by means of known OTDR measurement devices.

If the plaiting angle is approximately 35°, the so-called neutral angle is set. This means that in case of internal pressure, the plaiting, which can be considered analogous to a hose, will become neither longer nor shorter. If the plaiting angle is smaller than the neutral angle, the diameter becomes smaller and the plaiting becomes longer in case of internal pressure.

Since for the example, a buckling of the fiber 1 is desired, the plaiting angle is greater than 35°, in this case 64.8°. If, in another case, one should want not a buckling and consequently a break, but instead a tearing as a result of tensile load, the plaiting angle according to the invention is selected smaller than the neutral angle: The result is that the plaiting becomes longer in case of swelling, until the surrounded wire etc. is torn.

Although the description of this invention has been given with reference to a particular embodiment, it is not to be construed in a limiting sense. Many variations and modifications of the invention will now occur to those skilled in the art. For a definition of the invention, reference is made to the appended claims.

What is claimed is:

1. A cable for detecting the presence of a liquid comprising:
   a frangible conductive filament,
   a first sheathing surrounding said filament and being of a material which swells upon exposure to the liquid to be detected, and
   a second sheathing surrounding the first sheathing and having a structure which changes its length in response to radial expansion whereby the filament is broken adjacent the location of the liquid to be detected.

2. The invention as claimed in claim 1 wherein said second sheathing is a plaiting with a plaiting angle which differs from the neutral angle.

3. The invention as defined in claim 2 wherein said plaiting is formed by a yarn of fiberglass.

4. The invention as defined in claim 2 wherein said plaiting is formed by a yarn of polyamide fibers.

5. The invention as defined in claim 2 wherein said plaiting is formed by a yarn of carbon fibers.

6. The invention as defined in claim 2 wherein said conductive filament is an optical fiber.

7. The invention as defined in claim 1 wherein said conductive filament is an electrical conductor.

8. The invention as defined in claim 1 including:
   an intermediate sheathing disposed between the first and second sheathing, said intermediate sheathing being permeable to the liquid to be detected and which prevents the material of the first sheathing from penetrating the second sheathing.

9. The invention as defined in claim 8 wherein said intermediate layer is a fibrous web.

10. The invention as defined in claim 1 wherein said first sheathing is a silicone material.

11. The invention as defined in claim 1 wherein said first sheathing is a cellulose material.

12. The invention as defined in claim 1 including:
    a protective sheathing surrounding said second sheathing, said protective sheathing being of a material which is dissolvable by the liquid to be detected.

* * * * *